(No Model.)
R. J. GARDNER.
PLANTER.
No. 328,306. Patented Oct. 13, 1885.
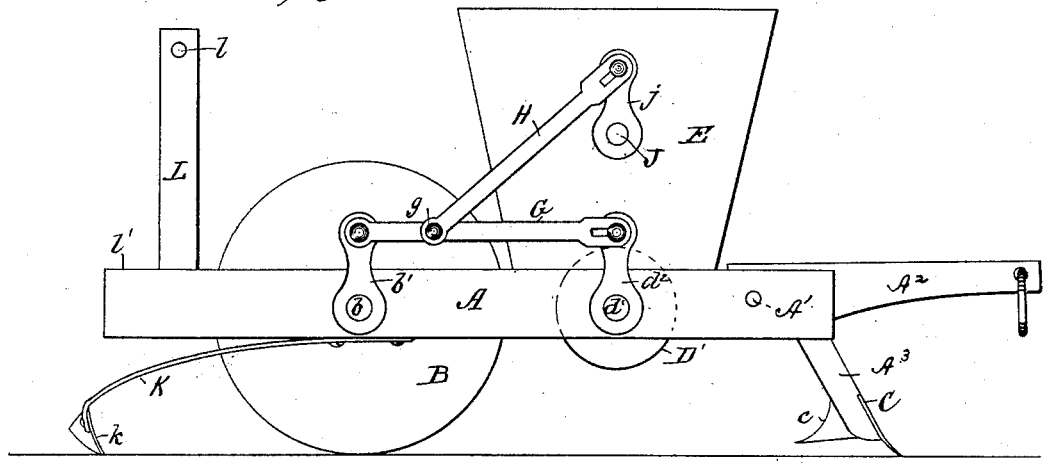
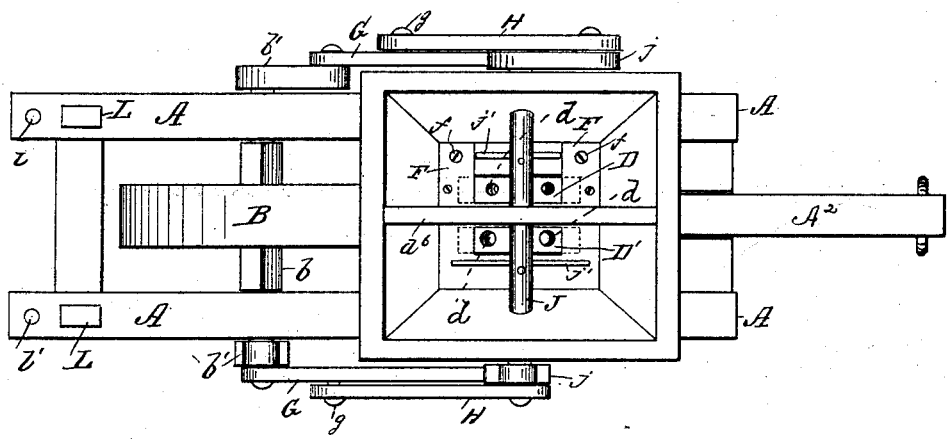
WITNESSES:
W. W. Hollingsworth
Solon C. Kemon
INVENTOR:
R. J. Gardner
BY Munn & Co.
ATTORNEYS.

UNITED STATES PATENT OFFICE.

ROBERT J. GARDNER, OF LOVELADY, TEXAS.

PLANTER.

SPECIFICATION forming part of Letters Patent No. 328,306, dated October 13, 1885.

Application filed May 7, 1885. Serial No. 164,708. (No model.)

*To all whom it may concern:*

Be it known that I, ROBERT J. GARDNER, a citizen of the United States, residing at Lovelady, in the county of Houston and State of Texas, have invented certain new and useful Improvements in Planters, of which the following is a description.

Figure 1 is a side view of the planter. Fig. 2 is a plan view of the same, looking downward from above.

This invention relates to planters for corn, cotton, other seed, or manure, which requires to be placed at intervals in a furrow in the ground; and it consists in the detailed construction of the parts, hereinafter fully described and claimed, for opening a furrow in the ground, depositing the seed in it, and covering it over with earth or soil.

In the accompanying drawings similar letters of reference indicate corresponding parts in all the figures.

Between the forward ends of the side frame, A, I pivot at A' the rear end of the supplemental beam B, to which the draft is applied. This beam is provided with a standard, $A^3$, on which I support the plow or shovel C. By this construction the strain of the plow is removed from the main frame of the planter, which may consequently be made lighter, and which can be conveniently raised on pivot A' in turning corners or in moving the machine from point to point, without raising the plow or shovel.

The plow C is for opening a furrow in the ground, and is provided with the projection $c$ immediately behind it for pressing open the sides of the furrow.

D is the planter-wheel, journaled in the side frames and provided with a series of pockets, $d$, in its circumference for planting corn or other similar seed.

E is a hopper for containing the seed to be planted, provided with a slot in the bottom of it, in which the planter-wheel D revolves.

F are regulating-plates attached to the bottom of the hopper by screws $f$, so as to nearly cover the open ends of the slot when the machine is used for planting corn or other similar seed. When the machine is to be used for planting cotton, the plates F are removed, and the screws which held them are inserted at intervals into the circumference of the planter-wheel, so that their heads just clear the ends of the slot.

B is the driving-wheel, which follows in the furrow. It is mounted on a shaft, $b$, journaled in the side frames, A, and provided with the cranks $b'$, set at right angles to each other. The planter-wheel shaft $d'$ is also provided with the cranks $d^2$. G are pitmen, which connect the cranks $b'$ with the cranks $d^2$, so that the motion of the driving-wheel is communicated to the planter-wheel.

Each pitman G is provided with a pin, $g$, near one end of it, which is connected by means of the pitman H with the cranks $j$ on each end of a shaft, J, which is journaled in the hopper E and is provided with fingers $j'$. This shaft is only used when planting cotton or other similar seed which requires to be kept stirred up. At other times, such as when planting corn, the shaft J may be removed from the machine entirely or disconnected from the driving mechanism.

K are spring-beams pivoted to the side frames, and provided with plows, $k$, which close in the furrow and thereby cover up the seed with soil. L are uprights secured to the ends of the side frames, and provided with holes $l$. $l'$ are holes in the ends of the side frames, to which and to the holes $l$ a rake or other implement can be attached for smoothing over the surface of the ground after the corn or cotton seed has been planted.

I sometimes secure a second wheel, D', upon the shaft $d'$ similar to wheel D, and divide the hopper into two parts by means of a partition-plate, $d^6$, which also separates the two wheels. I then use one side of the hopper for manure and the other side for seed, and deposit the two simultaneously in the ground.

It will be noticed that the pressing projection $c$ is held on the same support as and close to the rear side of the shovel C. By this construction the dirt is prevented from falling back into the furrow before being acted on by the presser, and the necessity of an additional support for the presser is avoided. This arrangement is especially desirable when the shovel and the planting devices are pivotally connected, as it retains the presser at all times in close proximity and proper relation with the shovel.

Having thus described my invention, what I claim as new, and desire to secure by Letters Patent, is—

The combination, in a seed-planter, of a main frame having side beams, A A, the standard secured midway between said beams at their forward ends, and provided at its lower end with a shovel, C, and a presser, c, located immediately in rear of said shovel, the hopper supported on said side beams, and having its planting mechanism arranged to drop the seed directly in the furrow formed by the shovel and presser, the wheel B journaled in the side beams in rear of the planting mechanism, and the independent shovels k, arranged in rear of the wheel B and having their supports K secured one to each side beam, all arranged and adapted to operate substantially as set forth.

ROBERT J. GARDNER.

Witnesses:
G. B. LUNDY,
J. F. KOONCE.